United States Patent [19]

Coetzer et al.

[11] 4,288,506
[45] Sep. 8, 1981

[54] CATHODE FOR AN ELECTROCHEMICAL CELL AND AN ELECTROCHEMICAL CELL

[75] Inventors: Johan Coetzer; Michael M. Thackeray, both of Pretoria, South Africa

[73] Assignee: South African Inventions Development Corp., Pretoria, South Africa

[21] Appl. No.: 72,762

[22] Filed: Sep. 5, 1979

[30] Foreign Application Priority Data

Sep. 22, 1978 [ZA] South Africa .................. 78/5392
Mar. 21, 1979 [ZA] South Africa .................. 79/1359
Apr. 11, 1979 [ZA] South Africa .................. 79/1739

[51] Int. Cl.³ .................. H01M 4/04; H01M 4/58; H01M 4/66
[52] U.S. Cl. .................. 429/199; 429/221; 429/223; 429/224; 429/245; 204/2.1; 252/182.1
[58] Field of Search .................. 429/103, 218, 221, 112, 429/223, 224, 245, 199; 204/2.1; 252/182.1

[56] References Cited

U.S. PATENT DOCUMENTS

| | | | |
|---|---|---|---|
| 3,380,856 | 4/1968 | Pohl | 204/2.1 |
| 3,410,730 | 11/1968 | Rightmire et al. | 136/100 |
| 3,956,194 | 5/1976 | Armand | 252/507 |
| 4,011,373 | 3/1977 | Kaun et al. | 429/218 |
| 4,011,374 | 3/1977 | Kaun | 429/103 |
| 4,041,220 | 8/1977 | Armand | 429/191 |
| 4,145,483 | 3/1979 | Bonnemay | 429/103 |

FOREIGN PATENT DOCUMENTS 2376194 7/1978 France .

*Primary Examiner*—Donald L. Walton
*Attorney, Agent, or Firm*—Arnold, White & Durkee

[57] ABSTRACT

A cathode for an electrochemical cell is disclosed, and a cell including it, together with an active cathode current collector for use in an electrochemical cell and methods of forming such a cathode.

The cathode in its discharged state comprises an intermediate refractory hard metal compound of at least one metal selected from:

chromium, iron, manganese, cobalt and nickel with at least one non-metal selected from:

carbon, boron, nitrogen, silicon and phosphorous.

The cathode is halogenated in its charged state.

To form the cathode, the intermediate refractory hard metal is formed and then activated to make it capable of reacting electrochemically with halide ions in use in a cell.

The active cathode current collector comprises a core of electroconductive material protected by said intermediate refractory hard metal compound as a surface layer thereon, activated to react electrochemically with halide ions in a cell.

25 Claims, 1 Drawing Figure

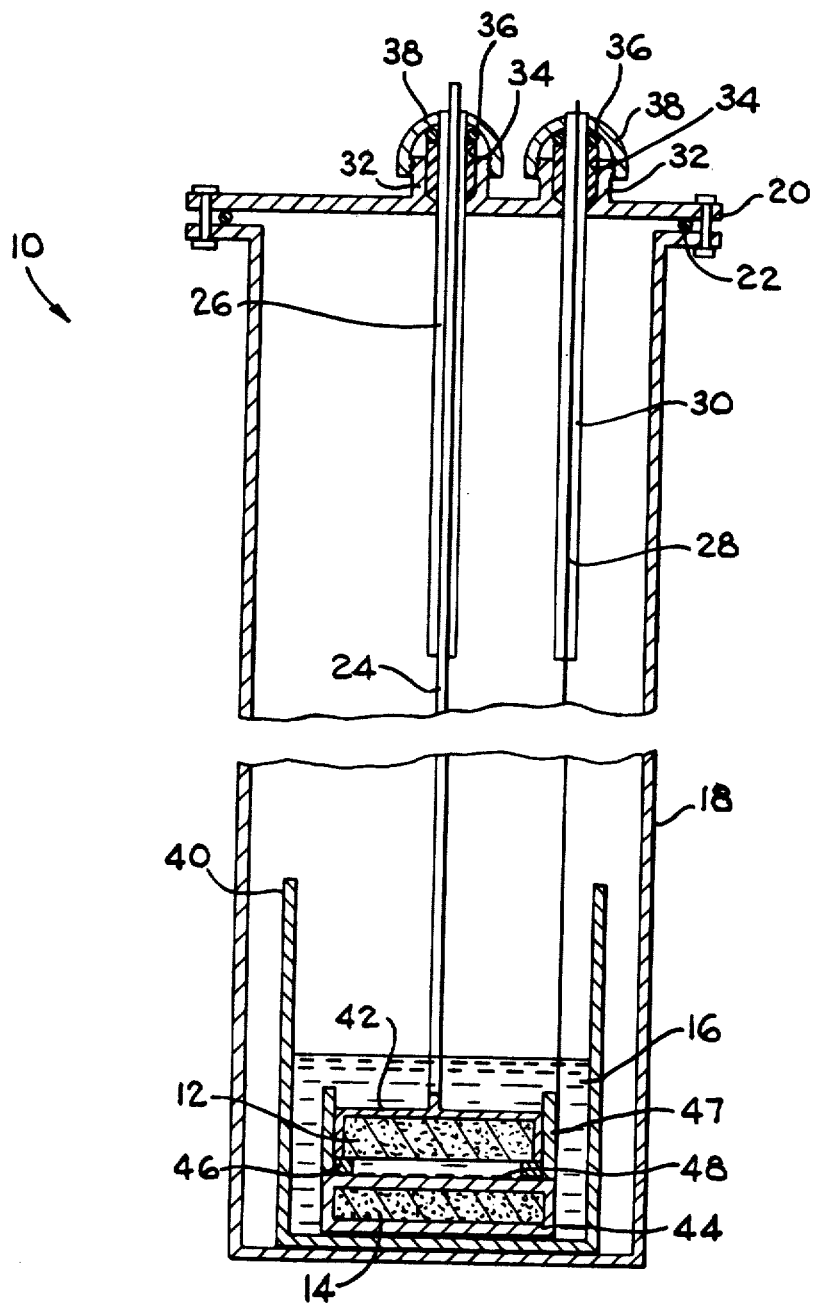

{ 4,288,506 }

CATHODE FOR AN ELECTROCHEMICAL CELL AND AN ELECTROCHEMICAL CELL

This invention relates to a cathode for an electrochemical cell, to the formation of such a cathode, and to an electrochemical cell incorporating such a cathode.

In recent times increasing attention has been given to the development of electrochemical energy storage mechanisms.

These developments have, however, been retarded to varying degrees by the difficulties involved in effectively immobilising, separating and controlling mobile electrochemically active substances.

Proposals to overcome some of the difficulties involved by, for example, using solid electrolytes to function as electrode separators, or by, for example, using electrochemically active substance compounds, have not been entirely successful and, in particular, have not been successful in relation to certain classes of electrochemically active substances.

Thus, for example, where solid electrolytes such as beta-alumina have been proposed, several disadvantages were presented. Since beta-alumina is a solid ceramic, it is shock-sensitive and, in addition, would generally give rise to a higher internal cell resistance than electrolytes which are liquid at cell operating temperatures. In addition, beta-alumina can, in certain cell conditions, be very prone to corrosion, thereby giving rise to cracks and defects which place a limitation on the effective life of such a cell.

The most promising developments to overcome some of the difficulties involved, have been in relation to electrochemically active substances for anodes. These developments relate to the use of alloys of, for example, lithium with aluminium or silicon as anodes. Such alloys are solid at the proposed operational temperatures of cells in which such anodes are to be used thereby resulting in effective immobilisation of the electropositive substance.

Similar attempts to overcome the problem of effectively immobilising electronegative substances have, however, not been entirely successful.

The most successful attempts that Applicants are aware of in this regard are, for example, attempts to circumvent the problem of sulphur immobilisation by the use of iron sulphides such as FeS or $FeS_2$.

This proposal does, however, have the disadvantage that an $FeS_2$ cathode is highly corrosive, that while an FeS cathode is less corrosive than an $FeS_2$ cathode, FeS has a significantly lower theoretical energy density than $FeS_2$, that an $FeS_2$ cathode will provide a two-stage discharge reaction, that sulphur becomes depinned to dissolve in the electrolyte, and that expansion of both FeS and $FeS_2$ during charge and discharge cycles can lead to mechanical failure of such cathodes.

Applicants are also aware of attempts to immobilise electronegative substances by forming intercalation compounds with graphite.

In such intercalation compounds, graphite exists in the form of rigid aromatic planes of carbon with the electronegative substances, such as, for example, $FeCl_3$ or $CrO_3$, located between the planes in molecular form.

During intercalation the spacing between the graphite planes will increase to accommodate the electronegative substance molecules.

The metal compounds remain in the graphite intercalation compound in stable molecular form, weakly bonded to the graphite structure. Once such an intercalation compound has been electrochemically discharged as a cathode, it would not be expected to revert to the original structure when charged.

This is supported in practice by the fact that because such cathodes are not able to be recharged, they are normally used as cathodes for primary cells, and not as cathodes for secondary cells.

Furthermore, graphite intercalation compounds are unstable even at temperatures below 400° C. so that, when heated, the intercalated species dissociates from the graphite host.

According to this invention there is provided a cathode for an electrochemical cell, the cathode comprising, in its discharged state, an intermediate refractory hard metal compound of at least one metal selected from the group consisting of chromium, manganese, iron, cobalt and nickel, with at least one non-metal selected from the group consisting of carbon, boron, nitrogen, silicon and phosphorus, the cathode being halogenated in its charged state.

In an embodiment of the invention the intermediate refractory hard metal compound can be an iron, chromium or manganese carbide.

In a further embodiment of the invention, the intermediate refractory hard metal compound may be a nickel or cobalt carbide.

In an alternative embodiment of the invention, the refractory hard metal compound may be an iron boride, nitride, silicide or phosphide.

In yet a further alternative embodiment of the invention, the refractory hard metal compound may be a cobalt, nickel or chromium boride.

In yet a further alternative embodiment of the invention, the refractory hard metal compound may be a chromium or nickel silicide, a cobalt phosphide or a manganese or chromium nitride.

In still a further alternative embodiment of the invention, the intermediate refractory hard metal compound may comprise a compound of at least one of the metals with a plurality of the non-metals, or a compound of a plurality of the metals with at least one of the non-metals.

Certain of the metals, or combinations of the metals, do not form stable compounds with certain of the non-metals, or combinations of the non-metals, and will therefore not be suitable for use as such as cathodes in accordance with this invention. Certain combinations may further not be sufficiently electron conductive for use as cathodes, and would therefore not be preferred.

In addition, from preliminary experiments conducted by Applicants, it appears that while certain intermediate refractory hard metal compounds in accordance with this invention may be stable, the compounds may become unstable when activated, or may become unstable when employed as cathodes in an electrochemical cell.

Thus, for example, when employed as cathodes in cells, they may become unstable to the extent that some of the cathode material may become sufficiently disassociated from the cathode to dissolve in or become suspended in the electrolyte and interfere significantly with continued operation of the cell.

Applicants believe that certain of such unstable or potentially unstable compounds may be rendered sufficiently stable for use when the compound comprises a compound of a plurality of the metals with at least one non-metal, a compound of at least one metal with a plurality of non-metals, or a compound of at least one of the metals, which is mixed with or alloyed with another transition metal, and at least one of the non-metals.

Where another transition metal is mixed with or alloyed with the metal, the other transition metal may conveniently constitute a minor proportion of the alloy or mixture.

In an embodiment of the invention, the other transition metal may, for example, constitute less than about 30%, and conveniently less than about 10-20% by mass of the metal.

As examples of this embodiment of the invention, the refractory hard metal compound may, for example, comprise a molybdenum-nickel-carbide, a tungsten-cobalt-carbide, a ferro-chrome carbide, or a ferro-manganese carbide.

In alternative examples of the invention, the refractory hard metal compound may comprise $Mn_8Si_2C$, $Fe_8Si_2C$, $Mn_5SiC$, or the like.

Applicants believe that where the compounds of this invention contain an excess of the non-metal, such compounds could, in general, be capable of use in cathodes in accordance with this invention since the excess non-metal could be both chemically and electrochemically inert and should therefore not be harmful in a cell environment unless the excess of non-metal causes a significant drop in the electrical conductivity.

It will be appreciated, however, that any significant excess of non-metal, which is chemically and electrochemically inert during use, will add unnecessarily to the mass of the cathode without making any contribution to the capacity of a cell incorporating such a cathode. In practice, therefore, any significant excess of non-metal should be avoided unless the excess significantly aids the electrical conductivity of the cathode or the pinning of the metal to the cathode structure during use.

The compounds of this invention can, in some cases, be formed with the metals and non-metals in different stoichiometries.

Thus, for example, where the metal is chromium and the non-metal is carbon, the following compounds can, for example, be formed:

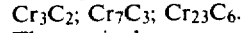
$Cr_3C_2$; $Cr_7C_3$; $Cr_{23}C_6$.

The particular compound selected for use could depend, inter alia, upon the following considerations:

1. When lifetime (number of cycles) is considered, the carbides having the greater carbon/metal ratio might tend to be preferred. This is because there might be a greater probability that the metal, after activation, would remain pinned to the carbon/metal structure during use thereby reducing the risk of poisoning of the electrolyte and break up of the cathode during use;

2. When capacity and cathode density are considered those compounds with a high metal:non-metal ratio would tend to be preferred because of the high proportion of active metal; and 3. When lifetime and macrostructural aspects are considered, then carbides capable of forming stable skeletal structures either by linkage between neighbouring carbon atoms or linkage of metal to carbon atoms would be preferred since such a skeletal structure would tend to maintain the structural integrity of the cathode.

The cathode of this invention may be formed in its unactivated state or in its activated or at least partially activated state.

In an embodiment of the invention, the cathode of this invention may be formed in its unactivated state by forming the refractory hard metal compound of at least one of the metals with at least one of the non-metals by any conventional means.

The compound so formed will be in an unactivated state and will require activation before it can be used as a cathode in a cell in accordance with this invention.

Where the compound is formed in an unactivated state, it may be activated chemically or electrochemically.

Thus, for example, the compound may, in some cases, be activated chemically by subjecting the heated compound in powdered or porous form to gas phase halogenation in a stream of halogen gas or in a stream of dilute halogen gas, or by treating the compound with other suitable halogenating agents.

In an alternative embodiment of the invention, the compound may be activated electrochemically by subjecting it to a plurality of charge and discharge cycles as an electrode in an electrochemical cell utilising a compatible electrode and utilising an electrolyte which can provide suitable halide ions for activated halogenation and which has an intrinsic electrolysis voltage threshold greater than the threshold voltage of the refractory hard metal compound.

Once such a cell has been subjected to sufficient charge/discharge cycles, the compound will have been activated sufficiently to allow it to be used as a cathode in a cell.

From experiments conducted by Applicants, it was found that the compound was activated sufficiently once it had been subjected to between 2 and 20 charge/discharge cycles.

The threshold voltage for halogenation will depend upon the particular metals and non-metals of the compounds. It is believed, however, that the threshold voltage for halogenation will also depend upon the particular halide ion as well as the alkali metal ion utilised in the activation process.

For reasons of thermal stability and size, it is expected that activation will not be possible in all cases with all halogens.

The electrolytes which could, for example, be employed to provide suitable halide ions could be the alkali metal and/or alkaline earth metal halide molten salt electrolytes, or $LiAlCl_4$ type electrolytes.

While the intrinsic electrolysis voltage thresholds of these electrolytes will depend upon the specific alkali metal or alkaline earth metals of the electrolytes, in general, when considering the alkali halides, the intrinsic electrolysis voltage threshold will tend to be the lowest for the iodides and the highest for the fluorides.

It must be appreciated therefore that it may not be possible or will not be practical to activate all compounds in accordance with this invention with all halogens.

In practice, therefore, it will be necessary to select appropriate molten salt electrolytes for activation of appropriate compounds in accordance with this invention.

With the object of producing a cell with the highest energy density and lightest mass, fluorides and chlorides would be most preferred and bromides and iodides the least preferred.

Where the halogenation threshold voltage of the intermediate refractory hard metal compound is not too high, the compound may thus, for example, be activated in situ as a cathode in an electrochemical cell where it is to be used in the cell with an electrolyte which has a sufficiently high intrinsic electrolysis voltage threshold.

In such a case, therefore, the cathode may be loaded into the electrochemical cell in its unactivated state.

On the other hand, if the initial halogenation threshold voltage of the compound is too high for the intrinsic electrolysis voltage threshold of the electrolyte with which the compound is to be used as a cathode in a secondary cell, the compound may be activated by using it as an electrode in an appropriate cell reaction where the electrolyte has a sufficiently high intrinsic electrolysis voltage threshold.

In such an activation process, as hereinbefore described, if the compound includes an excess of the metal, conditioning of the electrode to separate off excess metal can be effected at the same time.

When the compound has been activated in a separate cell, it may then be incorporated in an electrochemical cell for use.

Once the compound has been sufficiently activated at a particular voltage, is can usually operate effectively as a cathode at lower voltages. It follows therefore that if the compound is activated in a very stable electrolyte (which will usually be a very high melting electrolyte), it could then subsequently be used as a cathode in an electrochemical cell with a corresponding electrolyte or with a less stable but substantially lower melting electrolyte.

Applicants believe that in theory, but without desiring to be bound by such theory, the activated cathode of this invention may be halogenated in its charged state, and may be de-halogenated in its discharged state.

Investigations have been conducted by Applicants in an attempt to establish the composition of charged cathodes in accordance with this invention, and thus the halogenation mechanism and the specific function of the non-metals.

These investigations were conducted primarily in relation to two chromium carbides and iron carbide in accordance with this invention, namely $Cr_3C_2$, $Cr_5C_2$ (a mixed carbide) and $Fe_3C$.

These chromium carbides were used as cathodes in electrochemical cells employing aluminium anodes and $LiAlCl_4$ as electrolyte. The cells were subjected to a number of charge/discharge cycles whereafter the charged cathodes were subjected to powder X-ray diffraction analysis, to micro-analysis for carbon, to atomic absorption analysis and to scanning electron microscopical analysis.

The most significant results were provided by the powder X-ray diffraction analysis. This showed that in the specimens analysed, the carbide structure had either remained completely intact, or had remained sufficiently intact to suggest that the role of the non-metal carbon in the cathode was to participate in providing a skeletal structure in conjunction with the metal atom which maintained the integrity of the cathode, contributed to electron conductivity for the cathode and served the essential function of effectively pinning the metal chromium and the chloride thereof, in the cathode during use. Thus they do not become significantly disassociated from the cathode and adversely affect the operation of the cell by poisoning the electrolyte.

However, it may be that, instead, a completely new crystalline phase is formed, and the Applicant does not wish to be bound by theory in this regard.

The possibility cannot be ruled out that not only is the metal halogenated during activation and charging, but also the metal carbide species is halogenated i.e. the carbon participates with the metal in the halogenation reaction to form a novel metal chloride crystalline compound.

Iron carbide, purchased from CERAC INC., Milwaukee Wisconsin—$Fe_3C$ powder,—325 U.S. mesh was halogenated in two ways:

(1) A sample was activated electrochemically in a cell using $LiAlCl_4$ electrolyte and an Al anode. This electrochemically activated compound was used as a cathode in a cell and underwent 20 continuous charge/discharge cycles over a period of 30 days without exhibiting any significant loss of capacity. The cathode was extracted in the charged state for analysis.

(2) A further sample was chlorinated from the gas phase using a 50/50 by volume argon/chlorine mixture at a temperature of 170° C. for 4 hours.

Powder X-ray diffraction analyses were done on these two compounds as well as on the iron carbide starting material.

The resulting powder pattern analyses for these two compounds were similar, and exhibited new peaks some of which did not correspond with those of either $FeCl_2$ or $FeCl_3$, thereby suggesting the formation of a new iron carbide chloride crystalline compound.

Similar results were also obtained for chromium carbide.

These results show that the carbide compounds of this invention have no resemblance to graphite intercalation compounds such as graphite intercalated with iron chloride.

While the analyses were conducted only in relation to carbide compounds in accordance with this invention, experimental results indicate that the mechanism presumed for the carbide compounds of this invention, should apply to the borides, nitrides, silicides and phosphides of this invention.

In fact, from experimental results obtained by Applicants, it appears that where certain non-metals may not provide sufficient pinning of certain metals in a particular cell environment, other non-metals would be expected to provide better pinning for those metals in the same cell environment.

Experiments conducted by Applicants confirmed that from the potentials provided, the metal component participated substantially in the cell reaction. However, in some instances, potentials were provided which differed slightly from the theoretical potentials expected, thereby possibly indicating that, in certain circumstances, both the metal, and the metal in association with the non-metal, could participate in the cell reaction.

Of the non-metals included in the intermediate refractory hard metal compounds of this invention, depending upon specific cell environments, for reasons of cost and availability, it would be expected that carbon would be preferred.

Where compounds in accordance with this invention contain more than an insignificant excess of the metal, it may be necessary to pre-condition cathodes prior to use in separate appropriate electrochemical cells to allow separation of easily degradable and removable metal components which are the result of this excess.

Pre-conditioning may, for example, be effected in separate electrochemical cells by subjecting the cathodes to sufficient charge and discharge cycles to effect removal of excess metal.

It will be appreciated, however, that minor excesses of the metal could be tolerated where their separation during use in a cell will not interfere significantly with cell operation.

Where there is more than an insignificant excess of metal the compound structure would tend to break up during activation of the cathode leaving a residual stable skeletal structure. However, the structure would have little, if any, geometric crystallographic relationship to the original compound lattice. While the structure may, in the extreme case, become completely amorphous while remaining electrically and physically continuous, it would still possess the ability to pin the active metal.

It would be expected that this type of structure would not be particularly sensitive to starting impurities and would not be sensitive to starting crystallographic imperfections.

Refractory hard metal compounds comprising transition metal carbides, nitrides, borides, silicides and phosphides are characterised by their hardness and, in general, by their extreme chemical inertness.

For these reasons, while refractory hard metal compounds often exhibit high electrical conductivity, they would not normally be expected to provide any or sufficient electrochemical activity to allow them to be employed as electrodes in electrochemical cells.

Indeed, this assumption is supported by experiments conducted by Applicants with certain refractory hard metal compounds including compounds such as the interstitial carbides of titanium, vanadium, molybdenum, tantalum and tungsten.

These experiments were performed by using the transition metal refractory hard metal compounds as cathodes in appropriate electrochemical cells utilising anodes such as lithium aluminium alloy anodes, and utilising electrolytes such as multiple salt mixtures of alkali and/or alkaline earth metal halide salts.

These experiments showed either no electrochemical activity at all, or an insignificant degree of electrochemical activity up to an upper limit charging voltage of about 2.8 volts.

Despite the lack of electrochemical activity exhibited by titanium and vanadium refractory hard metal carbides, Applicants suprisingly found that the majority of intermediate refractory hard metal compounds of chromium, manganese, iron, cobalt and nickel exhibited sufficient electrochemical activity, and often exhibited substantial electrochemical activity, to justify their selection as cathodes in electrochemical cells.

Applicants therefore attempted to explain this apparent anomaly.

According to Van Nostrand's Scientific Encyclopedia a convenient classification of the binary compounds of carbon, is into ionic or salt-like carbides, intermediate carbides, interstitial carbides, and covalent binary carbon compounds.

Further, in the same reference, it is stated that by the term intermediate carbides, is meant compounds intermediate in character between the ionic carbides and the interstitial carbides. The intermediate carbides, such as those of chromium, manganese, iron, cobalt and nickel, are similar to the ionic carbides in that they react with water or dilute acids to give hydrocarbons, and they resemble the interstitial carbides in their electrical conductivity, opacity and metallic lustre.

These five metal carbides are therefore recognised as a distinct group, as are, in the same way, the borides, nitrides, silicides and phosphides of these five metals.

It is for this reason that the refractory hard metal compounds of this invention have been identified in this specification as intermediate refractory hard metal compounds.

The metals comprising chromium, manganese, iron, cobalt and nickel are unique in that their atomic radii obtained according to Goldschmidt and Pauling ("Refractory Hard Metals" (1953)—Schwarzkopf and Kieffer pp 12, 13) are in the range of 1.24 to 1.27 Angstrom units. Their atomic radii are therefore significantly smaller than those of other metals which form refractory hard metals.

In the same reference mention is made of Hägg's observation that the carbides of these five metals, because of the small atomic radii of the metals, have radius ratios (carbon radius:metal radius) slightly greater than 0.59 and hence have complicated structures. For the other transition metals where the ratio is below 0.59, the observed structures can in all instances be described as a close packed arrangement of metal atoms with carbon atoms in the interstices of the lattice.

In Linus Pauling's theory of the metallic bond a key postulate is that inter-atomic distance is a measure of bond strength and thus of the number of electron pairs resonating between the positions available in the metal crystal. For the first long period of the periodic table, the radii observed in the respective metal crystals indicate that the number of resonating bonds—that is, in Pauling's theory, the metallic valence of the atom—increases from 1 to 5.78 in series K, Ca, Sc, Ti, V, Cr; remains at 5.78 for Mn, Fe, Co, and Ni; and begins to fall with Cu. In addition, only Cr, Mn, Fe, Co and Ni possess an excess of electrons available for occupancy of the atomic d-orbitals after the required number of bonding electrons is deducted from the outer electron total.

Pauling has applied the above theory to explain the unusual structures of the mono silicides of chromium, manganese, iron, cobalt and nickel, and inferred that they form a series in which the metallic orbitals involved in forming the metal-silicon bonds display an increasing amount of d-character.

While available thermo-dynamic data on metal borides, silicides and phosphides is somewhat meagre, nevertheless there is sufficient data to detect simple treads in heats of formation and melting points. The values for the compounds of chromium, manganese, iron, cobalt and nickel are seen to be considerably lower than titanium and vanadium, and show only moderate variation.

Because different theoretical approaches to electron configuration and bonding in refractory hard metals have been postulated, and because their crystal chemistry displays great diversity, it is not possible, purely on theoretical considerations, to explain categorically why intermediate refractory hard metal compounds of chromium, manganese, iron, cobalt and nickel exhibit sufficient electrochemical activity for use as cathodes, while refractory hard metal compounds of certain related transition elements do not work under corresponding experimental conditions.

Nevertheless, without wishing to be bound by theory, Applicants believe that this distinction may be justified, and the classification of these metals as a group may be justified, on the basis of some of the evidence which has been obtained. In addition, from the practical point of view, the experiments conducted by Applicants have shown that the majority of intermediate refractory hard metal compounds of this invention exhibit electrochemical activity whereas refractory hard metal compounds of certain other transition metals do not exhibit sufficient electrochemical activity under the same conditions to warrent their consideration as cathodes in electrochemical cells.

The cathodes of this invention may be in the form of a self-supporting structure or matrix by being suitably compacted, by being suitably compacted with or supported by a binding agent, by being held in a supporting structure or matrix, by being contained in or located on a porous cathode holder, or the like.

In an embodiment of the invention, the cathode may be contained in a suitable porous, corrosion-resistant cathode holder.

In an example of this embodiment of the invention, the holder may be in the form of a porous graphite cup or vessel.

Compaction of the cathode can improve interparticle contact thereby providing for enhanced electron conductivity. Compaction of the cathode can, however, reduce the porosity of the cathode and thus influence the diffusion of the electrolyte into the cathode during use.

Compaction may therefore be carried out to balance the requirements of mechanical rigidity and improved electron conductivity against the requirement that electrolyte access to the cathode should be sufficient during use to allow the cathode to operate essentially as a three dimensional cathode and thus provide sufficient current density.

The invention further extends to a method of forming a cathode as hereinbefore described, and to a cathode whenever formed by the method as described.

The invention further extends to an electrochemical cell comprising a cathode, a compatible anode and a compatible electrolyte, the cathode being in the form of a cathode as described herein.

In an embodiment of the invention, the cathode may be loaded in the cell in its activated state.

In an embodiment of the invention, the cathode may be in an unactivated state, and the electrolyte may be an electrolyte which is capable of providing a source of suitable halide ions and has an intrinsic electrolysis threshold voltage greater than the threshold voltage of the cathode for activating the cathode by halogenation in situ.

The anode of the cell may be any anode which is compatible with the cathode and with the electrolyte.

In an embodiment of the invention, the anode may comprise or include an alkali metal, a combination of alkali metals, an alkaline earth metal, a combination of alkaline earth metals, a combination or alloy of alkali and alkaline earth metals or an alloy or combination composition containing alkali and/or alkaline earth metals.

Where the anode is in the form of an alkali metal, the alkali metal may conveniently be lithium or sodium.

Where the anode comprises an alkaline earth metal, the alkaline earth metal may conveniently be calcium or magnesium.

Where the anode comprises an alloy or composition containing alkali and/or alkaline earth metals, one or more of the alkali and/or alkaline earth metals may be included in the alloy or composition, and the remaining constituent of the alloy or composition may comprise any compatible metal or similar substance which can form a suitable alloy or composition with the alkali and/or alkaline earth metal.

Thus, for example, the remaining constituent may comprise silicon, aluminium, boron or the like.

Since the mass of the anode is often a factor of importance, in such instances the remaining constituent would preferably be a light metal or substance such as aluminium or silicon.

In an alternative embodiment of the invention, the anode may, for example, comprise or include aluminium or a suitable aluminium alloy.

In yet a further alternative embodiment of the invention, the anode may be in the form of a suitable electrochemically active substance sorbed in a molecular sieve carrier.

In an example of this embodiment of the invention, the molecular sieve carrier may be in the form of zeolites or zeolite-like substances.

The electrolyte may be any electrolyte which is compatible with the anode and the cathode employed in the cell.

While the electrolyte may be a solid electrolyte, because the electrochemically active metal of the refractory hard metal compound of the cathode will be held captive within the cathode during use in a cell, the electrolyte may conveniently be an electrolyte which will be molten or liquid at the cell operating temperature.

If desired, however, the electrolyte may comprise a combination of a solid electrolyte and a molten or liquid electrolyte between the solid electrolyte and the cathode.

Where the electrolyte is a solid electrolyte, it may be any suitable or conventional solid electrolyte such as, for example, beta alumina, nasicon (i.e. $Na_3Zr_2Si_2PO_{12}$), or the like.

In an embodiment of the invention the electrolyte may comprise a source of disassociated metal and halide ions.

Thus, for example, the electrolyte may include alkali metal or alkaline earth metal halide salts such as sodium chloride, calcium chloride, calcium fluoride, magnesium chloride, lithium bromide or the like.

In an alternative embodiment of the invention, the electrolyte may comprise binary, ternary etc. salt mixtures of alkali metal and/or alkaline earth metal halide salts.

Thus, for example, the electrolyte may comprise lithium iodide-potassium iodide, lithium chloride-potassium chloride, lithium chloride-magnesium chloride, lithium bromide-potassium bromide, lithium fluoride-rubidium fluoride, lithium chloride-lithium fluoride, calcium chloride-lithium chloride, lithium fluoride-lithium chloride-lithium bromide, and the like.

In an alternative embodiment of the invention, the electrolyte may comprise an alkali metal or alkaline earth metal halide electrolyte dissolved in an aprotic solvent.

The aprotic solvent may be any suitable solvent such as, for example, propylene carbonate or the like.

In an alternative embodiment of the invention, the electrolyte, for example, molten alkali metal halide salts, may be doped with an aluminium halide (e.g. $AlCl_3$) or with some other suitable dopant to reduce the melting point of the electrolyte.

Thus, for example, the electrolyte may be in the form of an alkali metal halide-aluminium halide mixture or a double salt or in the form of an alkaline earth halide-aluminium halide mixture or a double salt or a mixture thereof.

Thus, for example, the electrolyte may comprise $NaAlCl_4$; $LiAlCl_4$; $KAlCl_4$; $NaAlBr_4$; $LiAlBr_4$; $KAlBr_4$; $NaAlI_4$; $LiAlI_4$; $KAlI_4$; $Mg(AlCl_4)_2$; $Ca(AlCl_4)_2$; $Mg(AlBr_4)_2$; $Ca(AlBr_4)_2$; $Mg(AlI_4)_2$; $Ca(AlI_4)_2$, or the like.

Where the electrolyte is a mixture or a melt it may conveniently be an eutectic mixture or melt.

The cathode of this invention may further be used as an active cathode current collector where it serves the function of current collection and at the same time contributes to the cell capacity. As such it may be used as a current collector with any appropriate cathode in any approoriate cell, or with a cathode in accordance with this invention in a cell in accordance with this invention.

A cell in accordance with this invention may therefore include such a cathode current collector which may conveniently correspond with the cathode.

In an embodiment of the invention, where the cathode of this invention is intended to be used as a cathode current collector, it may be in the form of a composite current collector comprising a core of chrome, manganese, iron, cobalt or nickel having a protective refractory hard metal compound surface layer.

In yet a further embodiment, the current collector may be in the form of a layered current collector comprising a core of an electrically conductive substrate coated with a protective surface layer of a refractory hard metal compound in accordance with this invention.

In this embodiment of the invention, the electrically conductive substrate core may be selected from any compatible electrically conductive material such as, for example, copper, aluminium, copper-coated aluminium, iron, steel, or alloys thereof, with the substrate core being coated with the protective refractory hard metal layer.

For both the composite and layered current collectors of this invention, it is important that the protective surface layer should be continuous to protect the core, and should be thick enough to combat scratching off, minor flaws and penetration of the protective surface.

Composite and layered current collectors in accordance with this invention, can provide the advantage that the protective surface layer can readily be formed with a required thickness.

They can provide the further advantage that while the substrate or core materials are pliable and can readily be formed into wire, sheets, mesh and the like, the protective surface layers are hard and brittle.

The layered current collectors can provide the further advantage that a hard corrosion-resistant layer of a desired thickness can be provided around a bendable, highly conductive, light and cheap substrate or core to protect the core.

It will be appreciated that for both the composite and layered current collectors of this invention, it is of importance that the protective surface layer should be sufficiently thick for the protective surface layer not to be fully charged when a cell in which it is to be used, is fully charged. If this is not the case, the substrate or core would not necessarily be protected from chemical attack and degradation during use.

It will further readily be appreciated that an active cathode current collector in accordance with this invention can be used effectively with other types of conventional cathodes. In this event, the active cathode current collector can again contribute to the cell capacity while it will remain resistant to degradation for the reasons hereinbefore described.

While cells in accordance with this invention can have application both as primary and secondary cells, because of the rechargeability of cathodes in accordance with this invention, the cells would tend to have their major application as secondary or rechargeable cells.

It will be appreciated that cells in accordance with this invention can readily be assembled in battery form in conventional manner.

Embodiments of the invention are now described by way of example with reference to the accompanying drawing, and to a number of experiments which have been conducted.

The drawing shows a schematic arrangement of a typical electrochemical cell in accordance with this invention as employed for the purposes of the experiments which were conducted.

With reference to the drawing, reference numeral 10 refers generally to an electrochemical cell in accordance with this invention, comprising an anode 12, a cathode 14, and an electrolyte 16 housed within an outer casing 18.

The outer casing 18 includes a sealing lid 20 which is clamped onto the outer casing 18 and is sealed by means of an annular sealing ring 22.

The cell 10 includes an anode current collector 24 which is in the form of a stainless steel rod. The free end of the anode current collector 24 is sealed in a glass rod 26.

The cell 10 further includes a cathode current collector 28 in the form of a tungsten wire. The free end of the cathode current collector 28 is again sealed in a glass rod 30.

The glass rods 26 and 30 extend through the sealing lid 20 through locating sleeves 32 which project from the sealing lid 20.

The cell further includes two polytetraflouro ethylene (PTFE) sealing sleeves 34 which engage sealingly with the glass rods 26 and 30, two annular sealing rings 36 and two clamping nuts 38.

The clamping nuts 38 have threaded bores, whereas the locating sleeves 32 are threaded externally to cooperate with the threaded bores.

The clamping nuts 38 can therefore be tightened on the locating sleeves 32 to compress the sealing rings 36 and thus the PTFE sleeves 34 to thereby seal the glass rods 26 and 30.

The cell 10 further includes an alumina thimble 40 which houses the anode, cathode and electrolyte.

The anode 12 is compacted within an anode housing 42 which is of stainless steel and is integral with the anode current collector 24.

The cathode 14 is compacted within a cathode housing 44 which is of porous graphite, and which has the cathode current collector 28 connected thereto.

The anode 12 is maintained in spaced relationship above the cathode 14 by means of an annular alumina spacer 46, and an alumina collar 47 around the anode 12.

A zirconia felt separator 48 extends across the thimble 40 to separate the anode 12 from the cathode 14.

In the experiments which were conducted, the cathode 14 was in the form of a cathode in accordance with this invention, whereas the anode was in the form of a lithium-aluminium alloy for the high temperature experiments, and in the form of aluminium for the low temperature experiments.

For the high temperature experiments, the electrolyte was either an eutectic melt of LiF/LiCl/KCl or LiCl/KCl.

For the lower temperature experiments which were conducted, the electrolyte was in the form of $LiAlCl_4$.

A number of experiments were conducted, and a number of experiments are still in progress, with various electrochemical cells in accordance with this invention utilising the schematic cell arrangement of the electrochemical cell 10.

In the experiments which were conducted, the refractory hard metal compounds were formed by conventional means, whereafter the compounds were activated to constitute cathodes in accordance with this invention, by subjecting them to charge/discharge cycles as cathodes in electrochemical cells utilising compatible anodes and utilising electrolytes having sufficiently high electrolysis threshold voltages as hereinbefore described, and being capable of providing halide ions for halogenation during use.

The cathodes, anodes and electrolytes were maintained under inert argon conditions.

In the first series of experiments, various refractory hard metal carbides were tested at operating temperatures of 400° C. using lithium-aluminium alloy anodes and using LiF/LiCl/KCl electrolytes which were molten at the operating temperatures.

The results, and average results in some cases, of the first series of experiments are set out in Table I below.

In Tables I, II and III below, the abbreviations indicate the following:

VP (ch/di)—Voltage Plateau (charge/discharge)
EN—Experiment Number
dc—cathode
DC—Discharge Capacity (Amp hrs/g)
SCC—Short Circuit Current (amps)
OCV—Open Circuit Voltage (volts)
CE—Coulombic Efficiency (%)
L(cy/da)—Lifetime (cycles/days) for continuous charge/discharge.

TABLE 1

| EN | dc | DC | SSC | OCV | CE | VP Ch | di | L cy | da |
|---|---|---|---|---|---|---|---|---|---|
| 1 | $Fe_3C$ | 0.15 | 1.1 | 1.7 | 85 | 1.91 | 1.60 and 0.90 | 9 | 13 |
| 2 | $Cr_7C_3$ and $Cr_3C_2$ mixed | 0.18 | 0.9 | 1.5 | 60 | 2.00 | 1.45 | 37 | 50 |
| 3 | $Cr_3C_2$ | 0.25 | 0.95 | 1.4 | 67 | 2.10 | 1.35 | 50 | 82 |
| 4 | $Mn_{23}C_6$ | 0.17 | 1.6 | 1.30 | 90 | 1.30 and 2.1 | 1.82 and 1.21 | 40 | 26 |
| 5 | $Mn_xC_y$ (ie $Mn_3C$, $Mn_5C_2$ etc.) | 0.45 | 1.1 | 1.21 | 50 | 1.50 and 2.05 | 1.75 and 1.25 | 15 | 30 |

Experiments 1 and 2 were discontinued because sufficient data had been obtained. Experiments 3 and 5 terminated as a result of internal short circuiting. Experiment 4 terminated as a result of a sudden decrease in capacity.

In these experiments it was found that the useful working voltage range was up to about 3 volts on charge—above this range corrosion of tungsten wire feed throughs occurred.

Corresponding experiments with maximum charging voltages of about 3 volts which were conducted employing cathodes comprising tantalum carbide (TaC), tungsten carbide (WC and $W_2C$) and titanium carbide (TiC) yielded no electrochemical activity whatsoever, whereas corresponding experiments with vanadium carbide (VC) and molybdenum carbide ($Mo_2C$) yielded no significant electrochemical activity.

In the second series of experiments which were conducted various chrome carbides plus a few other carbides were tested as cathodes in low temperature cells operating at 200° C., using aluminium anodes and using $LiAlCl_4$ electrolytes.

The results of the second series of experiments and, in some cases, the average results are set out in Table II below.

TABLE 2

| EN | dc | DC | SSC | OCV | CE | VP Ch | di | L cy | da |
|---|---|---|---|---|---|---|---|---|---|
| 1 | $Cr_{23}C_6$ | 0.40 | 0.60 | 0.50 | 65 | 0.50 | 0.30 | 25 | 75 * |
| 2 | $Cr_7C_3$ and $Cr_3C_2$ mixed | 0.13 | 0.90 | 1.25 | 86 | 0.51 and 1.20 | 1.0 and 0.40 | 8 | 16 |
| 3 | $Cr_7C_3$ | 0.14 | 1.9 | 1.40 | 90 | 0.50 and 1.20 | 1.15 and 0.51 | 15 | 31 |
| 4 | $Cr_3C_2$ | 0.11 | 1.1 | 1.28 | 87 | 0.45 and 1.31 | 1.21 and 0.41 | 60 | 120 * |
| 5 | $Mn_xC_y$ (mixed) | 0 | — | — | — — | — | — | 8 |
| 6 | $Fe_3C$ | 0.15 | 1.06 | 0.76 | ±100 initially ±30 now | 1.05 | 0.65 | 155 | 370 * |

* The experiments so indicated are still continuing at the time of preparation hereof.

Experiments 2 and 3 were discontinued when the samples were required for analysis. Experiment 5 was terminated because no electrochemical activity was exhibited.

Corresponding experiments were conducted utilising chromium and iron as cathodes. These experiments demonstrated a marked decrease in activity with time resulting from disassociation of the metal from the cathode and thus poisoning of the electrolyte.

The two different open circuit voltages in the chrome series can reasonably be explained in terms of the different oxidation states of chromium which exist. $Cr_7C_3$ gives 30% of its discharge above 1 volt and $Cr_3C_2$ 60% above 1 volt. It is presumed therefore that in these two carbides a large proportion of the chromium has been oxidised to $Cr^{4+}$. For $Cr_{23}C_6$ nearly all the discharge is below 0.5 volts so that Cr is taken up to $Cr^{2+}$ or at most $Cr^{3+}$.

In the case of the $Fe_3C$ cathode the coulombic efficiency has fallen from about 100% originally to about 30% over a period of about one year of continuous cell operation. Applicants are satisfied that this is as a result of dendrite formation leading to internal shorting and thus a lowering of coulombic efficiency.

It should be noted that in all the series of experiments which were performed, as set out in Tables I to IV, most of the cells were prone to dendrite formation which led to internal shorting and a lowering of coulombic efficiency. This is primarily a function of cell design and can be improved substantially by appropriate design and by appropriate steps to combat dendrite formation. Thus, for example, where appropriate precautions were taken to contain dendrite formation such as in Experiment No. 4 in Table II with a $Cr_3C_2$ cathode, where a sintered glass disc separated the electrodes, the high coulombic efficiency (about 90%) has been maintained over a period of three months.

In all the experiments of Tables I, II, III and IV, all the cells were subjected to continuous charge/discharge cycles. Experiments were generally terminated because of mechanical faults or internal leaks which arose from dendrite formation at the anode. This was aggravated because the cathodes were activated in situ.

The reason why $Mn_xC_y$ does not show cathodic activity in the low temperature electrolyte of Table II, but does in the high temperature electrolyte of Table I can readily be explained on the basis of theoretical e.m.f.'s for the couples. Thus the Li/Mn (chloride electrolyte) couple provides a theoretical e.m.f. of 1.66 volts, whereas the Al/Mn (chloride electrolyte) couple provides a theoretical e.m.f. of minus 0.11.

In the third series of experiments, various metal borides, nitrides, silicides and phosphides were tested as cathodes in low temperature cells operating at 200° C., utilising aluminium anodes and $LiAlCl_4$ electrolytes.

The results of these experiments are set out in Table III below.

TABLE III

| EN | dc | DC | SSC | OCV | CE | VP Ch | VP di | L cy | L da |
|---|---|---|---|---|---|---|---|---|---|
| 1 | $Cr_2B$ | 0,06 | 0,65 | 1,13 | 100 | 0,80 and 1,20 | 1,00 and 0,61 | 15 | 8 |
| 2 | $Cr_2N$ | 0,07 | 0,65 | 1,12 | 20 | 0,80 | 0,35 | 17 | 20 |
| 3 | $Cr_3Si$ | 0,34 | 0,7 | 1,16 | 55 | 0,75 | 0,40 | 30 | 62* |
| 4 | MnB | 0,05 | 0,20 | 0,31 | 100 | 0,81 | 0,15 | 16 | 15 |
| 5 | $Mn_xN$ | 0 | — | — | — | — | — | — | 21 |
| 6 | $Mn_3P_2$ | 0,06 | 0,40 | 0,15 | 65 | 0,9 | 0,20 | 10 | 27* |
| 7 | $Fe_2B$ | 0,05 | 0,25 | 0,80 | 100 | 0,90 | 0,74 | 19 | 11 |
| 8 | FeSi | 0,21 | 1,02 | 0,74 | 78 | 0,95 | 0,75 | 16 | 41* |
| 9 | $Fe_3P$ | 0,30 | 0,80 | 0,79 | 65 | 1,10 | 0,60 | 12 | 37* |
| 10 | $Co_2B/Co_3B$ | 0,30 | 1,05 | 1,06 | 90 | 1,20 | 0,94 | 14 | 38* |
| 11 | $Co_2P$ | 0,27 | 0,55 | 0,89 | 91 | 1,21 | 0,92 | 15 | 35* |
| 12 | $Ni_3B$ | 0,1 | 0,9 | 0,85 | 90 | 1,10 | 0,75 | 10 | 6 |
| 13 | $Ni_2Si$ | 0,04 | 0,3 | 0,80 | 100 | 1,21 | 0,80 | 20 | 7 |

*The experiments so indicated were started fairly recently and are still continuing at the time of preparation hereof.

The following experiments were terminated because sufficient data had been obtained or because the cathodes were required for analysis: Experiment Nos. 1, 6, 11 and 12.

Experiment No. 2 was terminated as a result of an internal short, whereas Experiment No. 5 was terminated because it exhibited no electrochemical activity.

The charge and discharge current densities for all cells was in the region of 10 mA/cm$^2$.

Most of the cells were prone to dendrite formation which led to internal shorting and a lowering of coulombic efficiency. With proper cell design and with appropriate precautions to contain dendrite formation, the coulombic efficiency can be improved substantially and can be maintained at a sufficiently high level.

It will be noted from Tables II and III above, that the open circuit voltages are relatively low. This is, however, to be expected because of the aluminium anode which was used in these experiments. If a more electro positive material is used as anode, much higher open circuit voltages could be obtained. In some instances, the open circuit voltages could increase by more than double. This is substantiated by the open circuit voltages provided in the high temperature experiments of Table I.

It is submitted that on the basis of the experimental results as set out in Tables I to III above, if the coulombic efficiencies and open circuit voltages were increased as discussed, a number of cells could be provided which would operate effectively as secondary cells for use in off-peak storage and for use in powering electric vehicles.

A fourth series of experiments were conducted with various intermediate refractory hard metal compounds in accordance with this invention as cathodes. In the fourth series of experiments, the cells were operated as high temperature cells at 400° C. using lithium-aluminium alloys as anodes and using LiCl/KCl electrolytes.

The results of these experiments and, in some cases, the average results of a series of experiments, are set out in Table IV below.

TABLE IV(a)

| Experiment No. | 1 | 2 | 3 | 4 | 5 |
|---|---|---|---|---|---|
| Cathode | CrB | FeB | $Fe_2B$ | $Co_2B, Co_3B$ | $Fe_4N$ |
| OCV (v) | 1,57 | 1,77 | 2,0 | 2,0 | 1,8 |
| SSC (A) | 1,4 | 1,4 | 1,0 | 0,7 | 1,4 |
| Cut-off limits(V) | 2,2 0,6 | 2,4 0,7 | 2,4 0,7 | 2,4 0,7 | 2,3 0,7 |
| Charge plateau (v) | 1,9 | 2,3 | 2,3 | 2,3 | 2,0 |
| Discharge plateau | 1,5 | 1,7 | 1,35 | 1,85 | 1,8 |
| Charge current (mA) | 22 | 30 | 37 | 50 | 33 |
| Discharge current (mA) | 36 | 30 | 37 | 50 | 34 |
| Max. cell capacity (A-h/g) | 0,081 (9th cycle) | 0,075 (7th cycle) | 0,215 (1st cycle) | 0,267 (1st cycle) | 0,110 (4th cycle) |
| Coulombic efficiency (%) | 54 | 71 (7th cycle) | 85 (3rd cycle) | 76 (1st cycle) | 45 (1st cycle) |
| No. of cycles | 16 | 15 | 6 | 13 | 23 |

TABLE IV (b)

| Experiment No. | 6 | 7 | 8 | 9 | 10 |
|---|---|---|---|---|---|
| Cathode | $Mn_xN$ | $Cr_3Si$ | $Ni_3B$ | $Fe_3P$ | $Ni_2Si$ |
| OCV (v) | 1,36 | 1,8 | 2,1 | 1,85 | 2,10 |
| SSC (A) | 0,27 | 1,3 | 0,9 | 1,20 | 2,00 |
| Cut-off limits(V) | 1,7 0,5 | 2,2 0,7 | 2,4 0,7 | 2,7 0,5 | 2,3 0,50 |
| Charge plateau (v) | 1,6 0,8 | 1,6 2,1 | 2,4 | 1,91 | 2,2 1,7 0,8 |
| Discharge plateau | 0,7 | 1,28 0,8 | 2,0 | 1,70 | 2,1 1,5 0,7 |
| Charge current | | | | | |

TABLE IV (b)-continued

| Experiment No. | 6 | 7 | 8 | 9 | 10 |
|---|---|---|---|---|---|
| (mA) Discharge current | 50 | 33 | 30 | 30 | 24 |
| (mA) | 50 | 33 | 30 | 32 | 40 |
| Max. cell capacity (A-h/g) | 0.267 (7th cycle) | 0.087 (3rd cycle) | 0.100 (1st cycle) | 0.12 | 0.144 |
| Coluombic efficiency (%) | 84 | 66 | 54 | 75 | 88 |
| No. of cycles | 14 | 4 | 9* | 8* | 8* |

*The experiments so indicated were still continuing at the time of preparation hereof.

In regard to all the cells which were tested, it must be appreciated that the cell capacities were not optimised. The coulombic efficiency could therefore be improved substantially by effective cell design and by reducing the extent of short circuiting as a result of dendrite formation.

The first, second and fifth experiments were terminated as a result of bad internal leaks. The third experiment was terminated because of mechanical faults and shorting.

From the experimental results as set out in Table IV above, it is submitted that a number of optimised cells in accordance with this invention should operate effectively as secondary cells which can be of value in powering electric vehicles and in off-peak energy storage systems.

The experimental results indicate that the cathodes of this invention exhibit good electronic conductivity both in the charged and uncharged states of the cells. Applicants believe that the electronic conductivity of the cathodes is effectively provided by the metal-carbide, -boride, -nitride, -silicide or -phosphide network or lattice of the cathode that remains substantially intact throughout cell operation.

Without wishing to be bound by theory, Applicants believe that in operation of the experimental cells as described, halogen ions from the electrolyte react with the metal of the cathode to form metal halide complexes. The electrolyte serves the function of mass transport between the electrodes. In other words, upon charging of the cell, the electrolyte phase will become poorer or depleted in alkali metal halide, with the alkali metal depositing on the anode and the halide reacting with the metal of the cathode to form metal carbide, boride, nitride, silicide or phosphide halides. Upon discharging of the cell, the electrolyte phase will become richer in alkali metal halides.

It is believed therefore that throughout the cell reaction, only the metal, or possibly the metal compound, and the alkali metal atoms undergo changes in oxidation state.

The results of the experiments which were performed further indicate that, under appropriate conditions, the metal component of the activated refractory hard metal compound will be held captive in the cathode during operation of the cell.

Appropriate embodiments of the invention as illustrated in the experiments, therefore, provide the advantage that the metals are pinned in the activated cathode thereby combatting disassociation during use and thus combatting poisoning of the electrolyte and limitation of the effective life of a cell utilising such a cathode.

The cathodes and electrochemical cells forming the subject matter of the experiments which were performed, can, therefore, under appropriate conditions, provide the advantages that the activated cathodes are stable, are inexpensive, can provide good electronic conductivity both in the charged and uncharged states, are compatible with low melting point electrolytes, and will hold the electrochemically active metals captive during use while the metals remain accessible and available for electrochemical activity.

Applicants further believe that the experimental results suggest the inference that cathodes in accordance with this invention operate effectively as three dimensional cathodes thereby substantially enhancing the capacity of cells incorporating such cathodes.

Applicants further believe that the experimental results indicate that optimised cells in accordance with this invention can provide the advantages of ease of operation, simplicity of construction, reasonable energy density and good power to weight ratios.

The power to weight ratios can be improved particularly where low melting point electrolytes are used since lighter cell casings (for example of synthetic plastics material) than would otherwise be possible could be used, and since relatively unsophisticated heating systems could be used.

While certain cells in accordance with this invention may only provide relatively moderate energy densities, the energy densities should nevertheless be sufficient to warrant the effective use of such cells because of the various advantages which such cells can provide over other competitive cells having higher energy densities such as, for example, cells incorporating sulphur based cathode systems.

We claim:

1. A cathode for an electrochemical cell, the cathode comprising as the electrochemically active material an intermediate refractory hard metal compound of at least one metal selected from the group consisting of chromium, manganese, iron, cobalt and nickel, with at least one non-metal selected from the group consisting of carbon, boron, nitrogen, silicon and phosphorus, which has been activated by halogenation.

2. A cathode according to claim 1, in which the intermediate refractory hard metal compound is an iron, chromium or manganese carbide.

3. A cathode according to claim 1, in which the intermediate refractory hard metal compound is a cobalt or nickel carbide.

4. A cathode according to claim 1, in which the intermediate refractory hard metal compound is an iron boride, nitride, silicide or phosphide.

5. A cathode according to claim 1, in which the intermediate refractory hard metal compound is a cobalt, nickel, or chromium bromide.

6. A cathode according to claim 1, in which the intermediate refractory hard metal compound is a chromium or nickel silicide, a cobalt phosphide or a manganese or chromium nitride.

7. A cathode according to claim 1, in which the intermediate refractory hard metal compound comprises a compound of at least one of the metals with a plurality of the non-metals.

8. A cathode according to claim 1, in which the intermediate refractory hard metal compound comprises a compound of a plurality of the metals with at least one of the non-metals.

9. A cathode according to claim 1, which has been formed in an unactivated state, and which has been activated to make it capable of reacting electrochemically by subjecting the cathode to a plurality of charge and discharge cycles as an electrode in an electrochemical cell utilising an electrolyte which can provide suitable halide ions and which has an intrinsic electrolysis voltage threshold greater than the threshold voltage of the cathode.

10. An electrochemical cell comprising a cathode, a compatible anode and a compatible electrolyte, the cathode comprising as the electrochemically active material an intermediate refractory hard metal compound of at least one metal selected from the group consisting of chromium, manganese, iron, cobalt and nickel, with at least one non-metal selected from the group consisting of carbon, boron, nitrogen, silicon and phosphorus which has been activated by halogenation.

11. A cell according to claim 10, in which the anode comprises an alkali metal anode.

12. A cell according to claim 10, in which the anode comprises an alkali metal alloy anode.

13. A cell according to claim 12, in which the anode comprises an alkali metal aluminium or silicon alloy.

14. A cell according to claim 10, in which the anode comprises an aluminium anode.

15. A cell according to claim 10, in which the electrolyte comprises a multiple salt mixture of alkali and/or alkaline earth metal halide salts.

16. A cell according to claim 10, in which the electrolyte comprises an alkali metal halide-aluminium halide mixture.

17. A cell according to claim 10, including an active cathode current collector which corresponds with the cathode.

18. A method of forming a cathode for an electrochemical cell, which includes the steps of forming as the electrochemically active material an intermediate refractory hard metal compound of at least one metal selected from the group consisting of chromium, manganese, iron, cobalt and nickel, with at least one non-metal selected from the group consisting of carbon, boron, nitrogen, silicon and phosphorus, and activating the refractory hard metal compound by halogenation to make it capable of reacting electrochemically during use in a cell.

19. A method according to claim 18, in which the intermediate refractory hard metal compound is activated by subjecting it to a plurality of charge and discharge cycles as an electrode in an electrochemical cell utilising a compatible electrode and utilising an electrolyte which can provide suitable halide ions and which has an intrinsic electrolysis voltage threshold greater than the threshold voltage of the refractory hard metal compound for activating said refractory hard metal compound.

20. A method according to claim 18, in which the intermediate refractory hard metal compound is activated by gas phase halogenation.

21. A method according to claim 18, which includes the step of compacting the compound in powdered form into a porous cathode holder.

22. A cathode whenever formed by the method as claimed in claim 18.

23. An active cathode current collector for use with a cathode in an electrochemical cell, the active cathode current collector comprising as the electrochemically active material an intermediate refractory hard metal compound of at least one metal selected from the group consisting of chromium, manganese, iron, cobalt and nickel, with at least one non-metal selected from the group consisting of carbon, boron, nitrogen, silicon and phosphorus, and the cathode current collector being in an activated stage having been activated by halogenation.

24. A current collector according to claim 23, in which the current collector includes a core of an electrically conductive material, with the core being protected by the activated intermediate refractory hard metal compound arranged as a surface layer thereon.

25. An electrochemical cell comprising a cathode, a compatible anode and a compatible electrolyte, the cathode comprising as the electrochemically active material an intermediate refractory hard metal compound of at least one metal selected from the group consisting of chromium, manganese, iron, cobalt and nickel, with at least one non-metal selected from the group consisting of carbon, boron, nitrogen, silicon and phosphorus, in which the cathode is in an unactivated state, and in which the electrolyte is an electrolyte suitable for activating the cathode in situ by halogenation, the electrolyte being adapted to provide a source of suitable halide ions and having an intrinsic electrolysis threshold voltage greater than the threshold voltage of the cathode.

* * * * *